(12) United States Patent
Kraynev et al.

(10) Patent No.: US 8,360,922 B2
(45) Date of Patent: *Jan. 29, 2013

(54) MULTI-SPEED PLANETARY TRANSMISSION WITH UP TO TEN FORWARD SPEED RATIOS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/954,932

(22) Filed: Nov. 29, 2010

(65) Prior Publication Data

US 2011/0207573 A1  Aug. 25, 2011

(30) Foreign Application Priority Data

Feb. 25, 2010 (RU) ................................ 2010107093

(51) Int. Cl.
*F16H 3/62* (2006.01)
(52) U.S. Cl. ........................................ 475/277; 475/311
(58) Field of Classification Search ........... 475/269–330
See application file for complete search history.

(56) References Cited

U.S. PATENT DOCUMENTS

| 4,070,927 A | 1/1978 | Polak |
| 4,709,594 A | 12/1987 | Maeda |
| 4,802,385 A | 2/1989 | Hiraiwa |

(Continued)

FOREIGN PATENT DOCUMENTS

| JP | 09-126283 A | 5/1997 |
| RU | 2290551 C1 | 12/2006 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 16096-0001 USA.

(Continued)

*Primary Examiner* — Justin Holmes
(74) *Attorney, Agent, or Firm* — Quinn Law Group, PLLC

(57) ABSTRACT

A multi-speed transmission is provided that includes an input member, an output member, a stationary member, a first and a second compound planetary gear set. The first compound planetary gear set has a first, second, third, fourth, and fifth member. The second compound planetary gear set has a first, second, third, and fourth member. The first member of the second compound planetary gear set is continuously connected for common rotation with the output member. The second member of the second compound planetary gear set is continuously grounded to the stationary member. None of the members of the first compound planetary gear set are continuously connected for common rotation with any of the members of the second compound planetary gear set. Seven torque-transmitting mechanisms are selectively engagable in combinations of three to establish up to ten forward speed ratios between the input member and the output member.

17 Claims, 1 Drawing Sheet

U.S. PATENT DOCUMENTS

| | | | |
|---|---|---|---|
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 2006/0014603 A1 | 1/2006 | Raghavan et al. | |
| 2008/0274853 A1 | 11/2008 | Raghavan | |
| 2011/0207575 A1* | 8/2011 | Kraynev et al. | 475/297 |

FOREIGN PATENT DOCUMENTS

| | | |
|---|---|---|
| RU | 2348542 C1 | 3/2009 |
| SU | 968545 A2 | 10/1982 |
| SU | 1293419 A1 | 2/1987 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 |
|---|---|---|---|---|---|---|---|---|---|
| REV | -4.5 |  | x |  |  | x |  |  | x |
| 1st | 5.4 |  | x |  |  | x |  | x |  |
| 2nd | 4.4 | 1.23 |  | x | x |  |  | x |  |
| 3rd | 3.6 | 1.22 | x | x |  |  |  | x |  |
| 4th | 2.7 | 1.33 | x |  |  | x |  | x |  |
| 5th | 1.97 | 1.37 |  | x |  | x |  | x |  |
| 6th | 1.5 | 1.31 | x |  |  | x | x |  |  |
| 7th | 1.22 | 1.23 |  | x | x |  |  | x |  |
| 8th | 1.0 | 1.22 | x | x |  |  |  | x |  |
| 9th | 0.75 | 1.33 | x |  |  | x |  | x |  |
| 10th | 0.55 | 1.36 |  | x |  | x | x |  |  | x = Engaged State

MULTI-SPEED PLANETARY TRANSMISSION WITH UP TO TEN FORWARD SPEED RATIOS

CROSS-REFERENCE TO RELATED APPLICATION

This application claims the benefit of Russian Patent Application No. 2010107093, filed Feb. 25, 2010, which is hereby incorporated by reference in its entirety.

TECHNICAL FIELD

The invention relates to a multi-speed planetary transmission with seven torque-transmitting mechanisms and two compound planetary gear sets.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that can provide up to ten forward speed ratios with relatively low content and in a relatively compact layout, especially in comparison to a layshaft design providing the same number of forward speed ratios. The transmission includes an input member, an output member, and a stationary member. The transmission further includes a first and a second compound planetary gear set. The first compound planetary gear set has a first, a second, a third, a fourth, and a fifth member. The second compound planetary gear set has a first, a second, a third, and a fourth member. In referring to the members of the compound planetary gear sets in this manner, the members may be counted "first" to "fourth" or "first" to "fifth" in any order (i.e., top to bottom, bottom to top, etc.) The members of the compound planetary gear sets are sun gear members, ring gear members and carrier members.

The first member of the second compound planetary gear set is continuously connected for common rotation with the output member. The second member of the second compound planetary gear set is continuously grounded to the stationary member. None of the members of the first compound planetary gear set are continuously connected for common rotation with any of the members of the second compound planetary gear set. As used herein, "common rotation" means rotation at the same speed (i.e., no relative rotation).

The transmission includes seven torque-transmitting mechanisms that are selectively engagable to interconnect respective ones of the members of the first compound planetary gear set with the input member, the stationary member or respective ones of the members of the second compound planetary gear set. The seven torque-transmitting mechanisms are engagable in combinations of three to establish up to ten forward speed ratios and a reverse speed ratio between the input member and the output member.

The input member is selectively connectable to the first and the second members of the first compound planetary gear set via engagement of a first and a second of the seven torque-transmitting mechanisms, respectively. The third and the fourth members of the first compound planetary gear set are selectively grounded to the stationary member via engagement of a third and a fourth of the seven torque-transmitting mechanisms, respectively. A fifth, a sixth, and a seventh of the seven torque-transmitting mechanisms are selectively engagable to connect the fifth member of the first compound planetary gear set with the first, the third, and the fourth members of the second compound planetary gear set, respectively. Shifts between at least some of the forward speed ratios are single-transition shifts.

The first and the second torque-transmitting mechanisms may be located axially adjacent one another with none of the planetary gear set members and none of the other torque-transmitting mechanisms therebetween. This minimizes transmission complexity and simplifies hydraulic feed to the torque-transmitting mechanisms, potentially reducing required pump capacity. Moreover, the third and the fourth torque-transmitting mechanisms may be located axially adjacent one another with none of the planetary gear set members and none of the other torque-transmitting mechanisms therebetween. Similarly, the fifth, the sixth, and the seventh torque-transmitting mechanisms are located axially adjacent one another with none of the planetary gear set members and none of the other torque-transmitting mechanisms therebetween.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
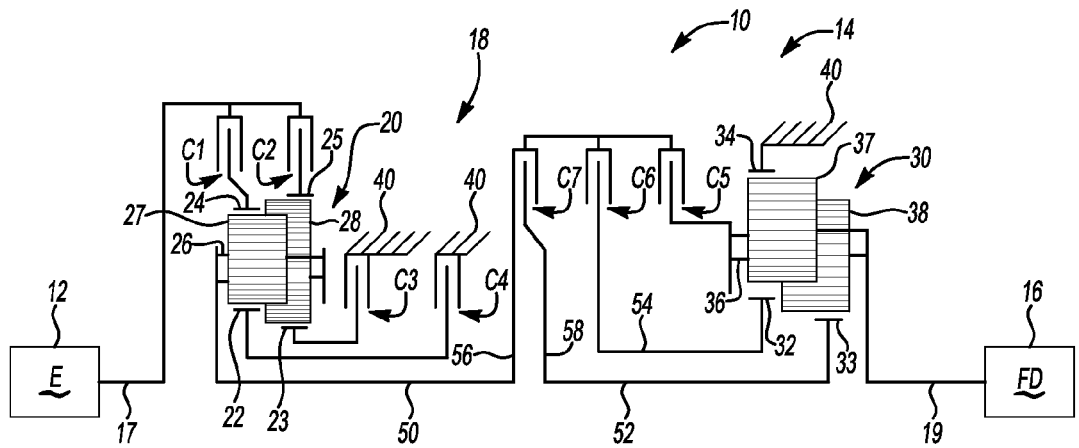
FIG. 1 is a schematic illustration in stick diagram form of a powertrain having a multi-speed planetary transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The planetary transmission 14 includes an input member 17 continuously connected with an output member of the engine 12, such as a crankshaft, optionally through a torque converter. The planetary transmission 14 further includes a planetary gear arrangement 18, and an output member 19 continuously connected with the final drive mechanism 16 for providing propulsion power to a vehicle wheels.

The planetary gear arrangement 18 includes two compound planetary gear sets: a first compound planetary gear set 20, and a second compound planetary gear set 30. The first compound planetary gear set 20 includes two sun gear members 22, 23, two ring gear members 24, 25, and a carrier member 26 that rotatably supports first and second sets of pinion gears 27, 28. Pinion gears 27 mesh with sun gear member 22 and ring gear member 24 as well as with pinion gears 28. Pinion gears 28 mesh with sun gear member 23 and ring gear member 25. The ring gear member 24 is referred to as a first member of the first compound planetary gear set 20, the ring gear member 25 is referred to as the second member of the first compound planetary gear set 20. The sun gear member 23 and the sun gear member 22 are referred to as the third and the fourth members, respectively of the first compound planetary gear set 20. The carrier member 26 is referred to as the fifth member of the compound planetary gear set 20.

The second compound planetary gear set 30 includes two sun gear members 32, 33, one ring gear member 34, and a carrier member 36 that rotatably supports first and second sets of pinion gears 37, 38. The first set of pinion gears 37 meshes with sun gear member 32, with ring gear member 34, as well as with the second set of pinion gears 38. Pinion gears 38 mesh with sun gear member 33. Ring gear member 34 is continuously grounded to a stationary member 40, such as a transmission casing. Compound planetary gear set 30 is commonly referred to as a Ravigneaux planetary gear set. The carrier member 36 is referred to as a first member of the compound planetary gear set 30. The ring gear member 34 is referred to as a second member of the compound planetary gear set 30. The sun gear member 32 is referred to as the third member of the compound planetary gear set 30. The ring gear member 34 is referred to as the fourth member of the compound planetary gear set 30.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C1, C2, C5, C6, and C7, are rotating-type clutches. Torque-transmitting mechanisms C3 and C4 are stationary-type clutches, also referred to as brakes. Only a portion of the transmission 14 above the axis of rotation established by the input member 17 is shown in FIG. 1. The planetary gear sets 20, 30 and torque-transmitting mechanisms C1, C2, C3, C4, C5, C6 and C7 are substantially symmetrical at a portion below the input member 17, not shown. In other embodiments, various ones of the torque-transmitting mechanisms may be friction clutches, synchronizers, band clutches, selectable one-way clutches, dog clutches and other possible types of torque-transmitting mechanisms.

As is apparent from FIG. 1, the input member 17 is not continuously connected for rotation with any of the gear members. The output member 19 is continuously connected for common rotation with carrier member 36. None of the gear members of the compound planetary gear set 20 are continuously connected for common rotation with any of the gear members of the compound planetary gear set 30.

The first torque-transmitting mechanism C1, also referred to as clutch C1, is selectively engagable to connect the input member 17 for common rotation with ring gear member 24. The second torque-transmitting mechanism C2, also referred to as clutch C2, is selectively engagable to connect the input member 17 for common rotation with the ring gear member 25. The third torque-transmitting mechanism C3, also referred to as brake C3, is selectively engagable to ground the sun gear member 23 to the stationary member 40. The fourth torque-transmitting mechanism C4, also referred to as brake C4, is selectively engagable to ground sun gear member 22 to the stationary member 40. The fifth torque-transmitting mechanism C5, also referred to as clutch C5, is selectively engagable to connect carrier member 26 for common rotation with carrier member 36. The sixth torque-transmitting mechanism C6, also referred to as clutch C6, is selectively engagable to connect carrier member 26 for common rotation with the sun gear member 32. The seventh torque-transmitting mechanism C7, also referred to as clutch C7, is selectively engagable to connect the carrier member 26 for common rotation with the sun gear member 33.

As shown in the truth table of FIG. 2, the torque-transmitting mechanisms are selectively engagable in combinations of three (listed as gear states) to provide ten forward speed ratios and a reverse speed ratio. Corresponding numerical gear ratios set forth in FIG. 2 result from the following gear tooth counts for the first compound planetary gear set 20: ring gear member 24 has 72 teeth, sun gear member 22 has 36 teeth, ring gear member 25 has 81 teeth, and sun gear member 23 has 18 teeth. Thus, the gear ratio of the ring gear member 24 to the sun gear member 22 with carrier member 26 stopped (for purposes of calculation only) is 2.0. The gear ratio of the ring gear member 25 to the sun gear member 23 with carrier member 26 stopped (for purposes of calculation only) is 4.5. The tooth counts for the second planetary gear set 30 are selected so that the gear ratio of the ring gear member 34 to the sun gear member 32 is −2.6 and the gear ratio of the ring gear member 34 to the sun gear member 33 is 4.0, in both cases assuming the carrier member 36 is stopped (for purposes of calculation only).

Assuming that torque at the input member 17 is T, the design of the transmission 14 is such that torque carried by the torque-transmitting mechanisms when engaged and by the members connected thereto is not greater than T, except for torque at the grounded ring gear member 34. A person of ordinary skill in the art would readily understand how to calculate torque at the various members based on a given input torque. By maintaining torque at the torque-transmitting mechanisms at less than or equal to input torque, smaller torque-transmitting mechanisms may be used and less hydraulic power is required.

Thus, there are seven underdrive speed ratios (1st to 7th), a direct drive (8th) and two overdrive speed ratios (9th and 10th). With the tooth counts listed above, the ratio steps listed in FIG. 2 are achieved. As is apparent in FIG. 2, the ratio steps are very even in the forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio, clutches C1 and C7, and brake C4 are engaged. Torque is carried from the input member 17 through the first compound planetary gear set 20 along an intermediate shaft 50 through engaged clutch C7 along intermediate shaft 52 to sun gear member 33 and through second compound planetary gear set 30 to the output member 19. The output member 19 rotates in an opposite direction from the input member 17.

To establish the first speed ratio, clutches C1 and C6 are engaged, as well as brake C4. Torque is carried from the input member 17 to the intermediate shaft 50 as in the reverse speed ratio, but is carried through engaged clutch C6 to intermediate shaft 54 and sun gear member 32, through compound planetary gear set 30 to output member 19. Input member 17 and output member 19 rotate in the same direction, as in all of the forward speed ratios.

In a second forward speed ratio, clutches C2 and C6, and brake C3 are engaged. The shift from the first forward speed ratio to the second forward speed ratio is a double-transition shift, in that two different torque-transmitting mechanisms are engaged in the second forward speed ratio than in the first forward speed ratio.

In a third forward speed ratio, clutches C1, C2 and C6 are engaged. Torque is provided from the input member 17 through the compound planetary gear set 20 to both of the ring gear members 24, 25, through intermediate shaft 50, to intermediate shaft 54, to sun gear member 32, and through the second compound planetary gear set 30 to the output member 19. The shift from the second forward speed ratio to the third forward speed ratio is a single-transition shift in that only one torque-transmitting mechanism is disengaged and another engaged to shift between the speed ratios. The first planetary gear set 20 is inactive in that it does not affect the resulting third forward speed ratio because neither C3 nor C4 is engaged.

In a fourth forward speed ratio clutches C1 in C6 are engaged as well as brake C3. Torque is carried from the input member 17 to ring gear member 24, through the first compound planetary gear set 20, and along intermediate shafts 50 and 54 to sun gear member 32, through the second compound planetary gear set 30 to the output member 19. The shift from the third forward speed ratio to the fourth forward speed ratio is a single-transition shift.

In a fifth forward speed ratio, clutches C2 and C6 are engaged, as well as brake C4. Torque is carried from the input member 17 through the first compound planetary gear set 20 at ring gear member 25 and along intermediate shafts 50 and 54 to sun gear member 32, through the second compound planetary gear set 30 to the output member 19. The shift from the fourth forward speed ratio to the fifth floor speed ratio is a double-transition shift.

In the sixth forward speed ratio, clutches C1 and C5, as well as brake C4 are engaged. Torque is carried from the input member 17 through the first compound planetary gear set 20 at ring gear member 24 and along intermediate shaft 50 to carrier member 36, and to the output member 19. The shift from the fifth to the sixth forward speed ratio is a double-transition shift.

In a seventh forward speed ratio, clutches C2 and C5 as well as brake C3 are engaged. Torque is carried from the input member 17 to the sun gear member 25, through the first compound planetary gear set 20, along intermediate shaft 50 to the carrier member 36, and to the output member 19. The shift from the sixth forward speed ratio to the seventh forward speed ratio is a double-transition shift.

In eighth forward speed ratio, clutches C1, C2 and C5 are engaged. Torque is provided from the input member 17 through the compound planetary gear set 20 to both the ring gear members 24, 25, through compound planetary gear set 20 to the intermediate shafts 50 to carrier member 36, and to the output member 19. The shift from the seventh forward speed ratio to the eighth forward speed ratios is a single-transition shift. The first planetary gear set 20 is inactive in that it does not affect the resulting eighth forward speed ratio because neither C3 nor C4 is engaged.

In a ninth forward speed ratio, clutches C1 and C5, as well as brake C3 are engaged. Torque is carried from the input member 17 through the first compound planetary gear set 20 at ring gear member 24 and along intermediate shaft 50 to carrier member 36, and to the output member 19. The shift from the eighth forward speed ratio to the ninth forward speed ratio is a single-transition shift.

In a tenth forward speed ratio, clutches C2 and C5 are engaged, as well as brake C4. Torque is carried from the input member 17 to the ring gear member 25 through the compound planetary gear set 20 and intermediate shaft 50 to the carrier member 36, and to the output member 19. The shift from the ninth forward speed ratio to the tenth forward speed ratio is a double-transition shift.

Although ten forward speed ratios are available, the transmission 14 may be controlled to operate as a six-speed transmission, a seven-speed transmission, an eight-speed transmission, a nine-speed transmission, or a ten-speed transmission. For example, to operate the transmission 14 as a six-speed transmission, an algorithm stored in a controller that controls the valves to control hydraulic fluid flow to the torque-transmitting mechanisms may establish only the reverse speed ratio, and the second, third, fourth, sixth, eighth, and ninth forward speed ratios described above as first, second, third, fourth, fifth, and sixth speed ratios. In such a six-speed transmission, there would be only one double-transition shift from the third to the fourth forward speed ratio (i.e., from the fourth forward speed ratio to the sixth forward speed ratio of FIG. 2.)

To operate the transmission 14 as a seven-speed transmission, the sixth forward speed ratios described for the six-speed transmission would be utilized, as well as the tenth forward speed ratio shown in FIG. 2. In such a seven-speed transmission, there would be only two double-transition shifts, between the third and fourth forward speed ratios, (i.e. between the fourth and sixth forward speed ratios described above), as well as between the sixth and seventh forward speed ratios (i.e. between the ninth and tenth forward speed ratios of FIG. 2).

To operate the transmission 14 as an eight-speed transmission, the seven forward speed ratios described for the seven-speed transmission would be utilized, as well as the seventh forward speed ratio shown in FIG. 2. In such an eight-speed transmission, there would be three double-transition shifts, between the third and fourth forward speed ratios, (i.e. between the fourth and sixth forward speed ratios described above), between the fourth and fifth forward speed ratios (i.e., between the sixth and seventh forward speed ratios of FIG. 2), as well as between the seventh and eighth forward speed ratios (i.e. between the ninth and tenth forward speed ratios of FIG. 2).

To operate the transmission 14 as a nine-speed transmission, the eight forward speed ratios described for the eight-speed transmission would be utilized, as well as the fifth forward speed ratio shown in FIG. 2. In such a nine-speed transmission, there would be four double-transition shifts: between the third and fourth forward speed ratios, (i.e. between the fourth and fifth forward speed ratios of FIG. 2), between the fourth and fifth forward speed ratios (i.e., between the fifth and sixth forward speed ratios of FIG. 2), between the fifth and sixth forward speed ratios (i.e., between the sixth and seventh forward speed ratios of FIG. 2), as well as between the eighth and ninth forward speed ratios (i.e. between the ninth and tenth forward speed ratios of FIG. 2). The transmission 14 could also be operated with less than six forward speed ratios.

Referring to FIG. 2, it is apparent that clutch C7 is engaged only in the reverse speed ratio. The position of clutch C7 between a radially-extending hub 56 and another radially-extending hub 58 allows the use of a dog clutch or a selectable one-way clutch for clutch C7.

It is evident in FIG. 1 that rotating clutches C1 and C2 are located axially adjacent one another with no other clutches or brakes and no members of the planetary gear sets between the clutches. Locating clutches C1 and C2 adjacent one another in this manner enables hydraulic fluid flow to the clutches C1 and C2 to be through mostly common feed channels. Simplifying the hydraulic feed channels and reducing the overall length of the feed channels simplifies production of the transmission 14 and may enable a smaller pump for the hydraulic system. Likewise, brakes C3 and C4 are located axially-adjacent one another with no other torque-transmitting mechanisms or planetary gear set members therebetween. Similarly, clutches C5, C6 and C7 are located axially-adjacent one another (and axially-adjacent brakes C3 and C4) with no other torque-transmitting mechanisms or planetary gear set members therebetween. Location of the brakes C3, C4 and the clutches C5, C6, and C7, in this manner further simplifies production of feed channels and may reduce required pump size. Clutches C1 and C2 may be referred to as input clutches as they connect the input member 17 for rotation with different members of compound planetary gear set 20. Clutches C5, C6 and C7 may be referred to as range clutches as they connect members of the first compound planetary gear set 20 for common rotation with members of the second compound planetary gear set 30.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:
1. A multi-speed transmission comprising:
an input member;
an output member;
a stationary member;
a first and a second compound planetary gear set; wherein the first compound planetary gear set has a first, a second, a third, a fourth, and a fifth member; wherein the second compound planetary gear set has a first, a second, a third, and a fourth member; wherein the members of the planetary gear sets are sun gear members, ring gear members and carrier members; wherein the first member of the second compound planetary gear set is continuously connected for common rotation with the output member; wherein the second member of the second compound planetary gear set is continuously grounded to the stationary member; wherein none of the members of the first planetary gear set are continuously connected for common rotation with any of the members of the second planetary gear set; and
seven torque-transmitting mechanisms selectively engagable to interconnect respective ones of the members of the first compound planetary gear set with the input member, the stationary member or respective ones of the members of the second compound planetary gear set, the seven torque-transmitting mechanisms being engagable in combinations of three to establish up to ten forward speed ratios and a reverse speed ratio between the input member and the output member.

2. The multi-speed transmission of claim 1, wherein the input member is selectively connectable to the first and the second members of the first compound planetary gear set via engagement of a first and a second of the seven torque-transmitting mechanisms, respectively.

3. The multi-speed transmission of claim 2, wherein the first and the second torque-transmitting mechanisms are located axially adjacent one another with none of the planetary gear set members and none of the other torque-transmitting mechanisms therebetween.

4. The multi-speed transmission of claim 1, wherein the third and the fourth members of the first compound planetary gear set are selectively grounded to the stationary member via engagement of a third and a fourth of the seven torque-transmitting mechanisms, respectively.

5. The multi-speed transmission of claim 4, wherein the third and the fourth torque-transmitting mechanisms are located axially adjacent one another with none of the planetary gear set members and none of the other torque-transmitting mechanisms therebetween.

6. The multi-speed transmission of claim 1, wherein a fifth, a sixth, and a seventh of the seven torque-transmitting mechanisms are selectively engagable to connect the fifth member of the first compound planetary gear set with the first, the third, and the fourth members of the second compound planetary gear set, respectively.

7. The multi-speed transmission of claim 6, wherein the fifth, the sixth, and the seventh torque-transmitting mechanisms are located axially adjacent one another with none of the planetary gear set members and none of the other torque-transmitting mechanisms therebetween.

8. The multi-speed transmission of claim 6, wherein the seventh torque-transmitting mechanism is engaged only in the reverse speed ratio and is one of a dog clutch and a selectable one-way clutch.

9. The multi-speed transmission of claim 1, wherein shifts between at least some of the forward speed ratios are single-transition shifts.

10. The multi-speed transmission of claim 1, wherein the first, the second, the third, the fourth, and the fifth members of the first compound planetary gear set are a first ring gear member, a second ring gear member, a first sun gear member, a second sun gear member and a first carrier member, respectively; wherein the first carrier member rotatably supports first and second sets of pinion gears that mesh with one another; wherein the first set of pinion gears meshes with the first ring gear member and the second sun gear member; wherein the second set of pinion gears meshes with the second ring gear member and the first sun gear member;

wherein the first, the second, the third, and the fourth members of the second compound planetary gear set are a second carrier member, a third ring gear member, a third sun gear member, and a fourth sun gear member, respectively; wherein the second carrier member rotatably supports a first and a second set of pinion gears; wherein the first set of pinion gears of the second compound planetary gear set meshes with the third ring gear member, the third sun gear member, and the second set of pinion gears; and wherein the second set of pinion gears of the second planetary gear set also meshes with the fourth sun gear member.

11. A multi-speed transmission comprising:
an input member;
an output member;
a stationary member;
a first and a second compound planetary gear set; wherein the first compound planetary gear set has a first, a second, a third, a fourth, and a fifth member; wherein the second compound planetary gear set has a first, a second, a third, and a fourth member; wherein the members of the compound planetary gear sets are sun gear members, ring gear members and carrier members; wherein the first member of the second compound planetary gear set is continuously connected for common rotation with the output member; wherein the second member of the second compound planetary gear set is continuously grounded to the stationary member; wherein none of the members of the first compound planetary gear set are continuously connected for common rotation with any of the members of the second compound planetary gear set;
seven selectively engagable torque-transmitting mechanisms;
wherein the input member is selectively connectable to the first and the second members of the first compound planetary gear set via engagement of a first and a second of the seven torque-transmitting mechanisms, respectively; wherein the third and the fourth members of the first compound planetary gear set are selectively grounded to the stationary member via engagement of a third and a fourth of the seven torque-transmitting mechanisms, respectively; wherein a fifth, a sixth, and a seventh of the seven torque-transmitting mechanisms are selectively engagable to connect the fifth member of the first compound planetary gear set with the first, the third, and the fourth members of the second compound planetary gear set, respectively; and said seven torque-transmitting mechanisms being engagable in combinations of three to establish up to ten forward speed ratios and a reverse speed ratio between the input member and the output member.

12. The multi-speed transmission of claim 11, wherein shifts between at least some of the forward speed ratios are single-transition shifts.

13. The multi-speed transmission of claim 11, wherein the first and the second torque-transmitting mechanisms are located axially adjacent one another with none of the compound planetary gear set members and none of the other torque-transmitting mechanisms therebetween.

14. The multi-speed transmission of claim 11, wherein the third and the fourth torque-transmitting mechanisms are located axially adjacent one another with none of the compound planetary gear set members and none of the other torque-transmitting mechanisms therebetween.

15. The multi-speed transmission of claim 11, wherein the fifth, the sixth, and the seventh torque-transmitting mechanisms are located axially adjacent one another with none of the compound planetary gear set members and none of the other torque-transmitting mechanisms therebetween.

16. The multi-speed transmission of claim 11, wherein the seventh torque-transmitting mechanism is engaged only in the reverse speed ratio and is one of a dog clutch and a selectable one-way clutch.

17. The multi-speed transmission of claim 11, wherein the first, the second, the third, the fourth, and the fifth members of the first compound planetary gear set are a first ring gear member, a second ring gear member, a first sun gear member, a second sun gear member and a first carrier member, respectively; wherein the first carrier member rotatably supports first and second sets of pinion gears that mesh with one another; wherein the first set of pinion gears meshes with the first ring gear member and the second sun gear member; wherein the second set of pinion gears meshes with the second ring gear member and the first sun gear member;

wherein the first, the second, the third, and the fourth members of the second compound planetary gear set are a second carrier member, a third ring gear member, a third sun gear member, and a fourth sun gear member, respectively; wherein the second carrier member rotatably supports a first and a second set of pinion gears; wherein the first set of pinion gears of the second compound planetary gear set meshes with the third ring gear member, the third sun gear member, and the second set of pinion gears; and wherein the second set of pinion gears of the second planetary gear set also meshes with the fourth sun gear member.

* * * * *